June 2, 1970  J. KOVACS  3,515,916
ARRANGEMENT FOR COOLING THE LAMINATED BODY OF
ROTATING ELECTRIC MACHINES
Filed July 8, 1968  2 Sheets-Sheet 1

INVENTOR
JÁNOS KOVACS

BY Young + Thompson

ATTORNEYS

INVENTOR
JÁNOS KOVÁCS

BY Young & Thompson

ATTORNEYS

United States Patent Office 3,515,916
Patented June 2, 1970

3,515,916
ARRANGEMENT FOR COOLING THE LAMINATED BODY OF ROTATING ELECTRIC MACHINES
Janos Kovacs, Budapest, Hungary, assignor to Ganz Villamossagi Muvek, Budapest, Hungary, a corporation of Hungary
Filed July 8, 1968, Ser. No. 743,120
Int. Cl. H02k 9/22
U.S. Cl. 310—65      6 Claims

ABSTRACT OF THE DISCLOSURE

The laminated bodies of rotating electric machines are cooled by disposing cooling plates between the laminae. The cooling plates extend beyond a contour of the laminae, radially outwardly of or else within holes through the laminae, and have cooling fins stamped out of the plane of the plates and bent about their central line and disposed substantially perpendicular to the plane of the plate. Cooling tubes extend through the plates outside the laminae.

---

Figure 1:
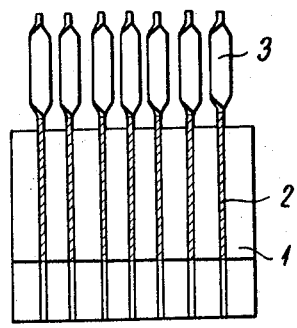

It is known that increased cooling of electric machines is aimed at. The result of increased cooling is the elimination of the harmful heating of electric machine, at better specific utilisation, higher efficiency and consequently an increase in the unit output obtainable from the electric machine.

The invention relates to the increased cooling of the laminated body of electric machines.

Many methods of cooling the laminated body of electric machines are known, the most widely employed of which are radial and axial cooling.

In radial cooling, the laminated body is subdivided into laminated units, between which ventilation slots are provided. The cooling aid—if it also flows through the rotor—flows between the shaft and the inner bore of the laminated rotor body into the rotor itself and escapes radially through the ventilating slots. The escaping air flows further through the ventilating slots in the stator to the casing if the laminated stator body is also formed with ventilating slots. In this system, the air flow is ensured by the ventilating inserts in the rotor as fan blade.

In axial ventilation, the laminated body is not subdivided into units, but the laminations are formed with holes in one or more rows, corresponding to the necessary cooling area, to ensure the flow of the air.

There are formed in the laminated body assembled from laminations thus produced axial passages through which the cooling air flows.

Axial cooling may be desirable in many cases, for example for shortening the length of the laminated body of the machine, since with axial cooling the length of the machine is reduced to the extent of the space occupied by the radial ventilation slots. The critical speed of the machine can thus be made favourable, and the length of the winding copper is shortened, whereby the copper losses of the stator and of the rotor, as also the space required for the machine in the longitudinal direction, etc., are reduced.

The use of axial ventilation passages and their cooling effect are unfavorably influenced by a number of factors. Only a limited number of passages having given dimensions can be provided in one row. If this is insufficient for the cooling area, the passages must be arranged in a number of rows, but their effectiveness is substantially lowered by the considerable heat loss between the rows of passages. Passages arranged in a number of rows increase the ring height of the laminated body and thus the diameter and the weight of the machine. With a given ring height, or dimensions, the number of passages which may be provided in one row and the number of rows are also limited by the magnetic flux, since the given magnetic flux must be contained between the passage walls.

A form of axial cooling is known in which axially finned cooling tubes extend axially through the ring of the laminated body. There is left between the laminations and the finned cooling tube a gap through which the coolant flows. The coolant also flows within the tube. This construction also considerably increases the ring height if a corresponding cooling is to be achieved.

A further method is known in which fins formed on the laminated body itself by pressing are situated along the periphery of the ring of the laminated body. In this construction, however, a considerable heat loss also occurs in the ring of the machine from the windings disposed in the slots to the fins disposed on the periphery. A considerable heat loss also occurs in the fins formed from the alloyed laminations and also on the surface of the fins.

The object of the present invention is to obviate the disadvantages of the known axial cooling methods for cooling the laminated body of rotating electric machines, as also to increase the efficiency of the cooling.

The invention achieves the aforesaid object by the following means:

Between the laminations of the bodies, cooling plates are disposed which are preferably of copper or aluminum or alloys thereof. The cooling plates extend beyond the contour of the laminae, radially outward of or else within holes through the laminae, and have cooling fins stamped out of the plane of the plates and bent about their central line and disposed substantially perpendicular to the plane of the plate. Cooling tubes extend through the plates outside the laminae.

A preferred construction of the cooling arrangement according to the invention is illustrated in the drawings.

Figure 2:
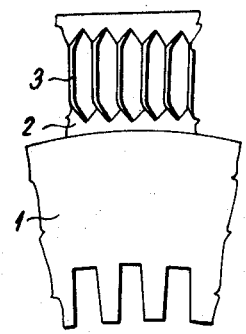
Figure 3:
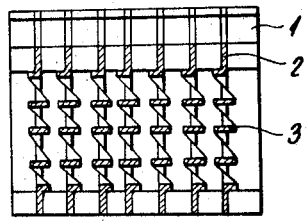
Figure 4:
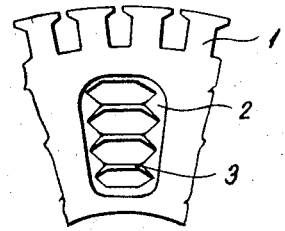
Figure 5:
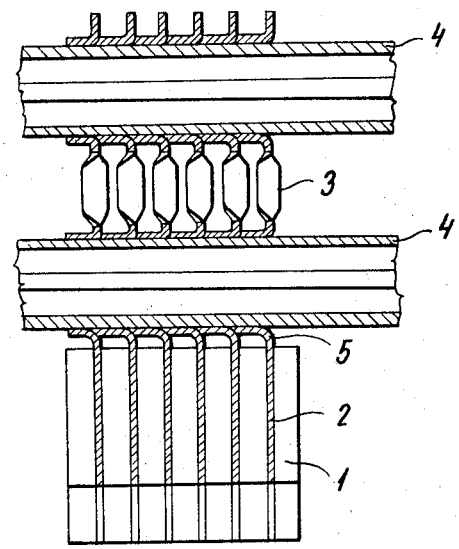
Figure 6:
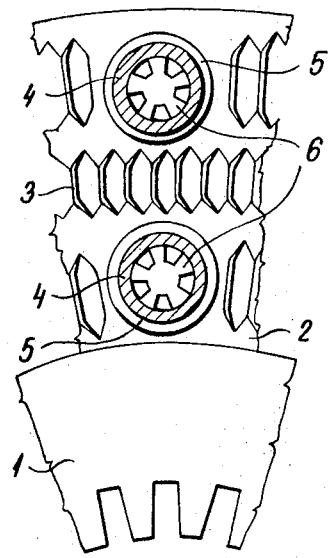
Figure 7:
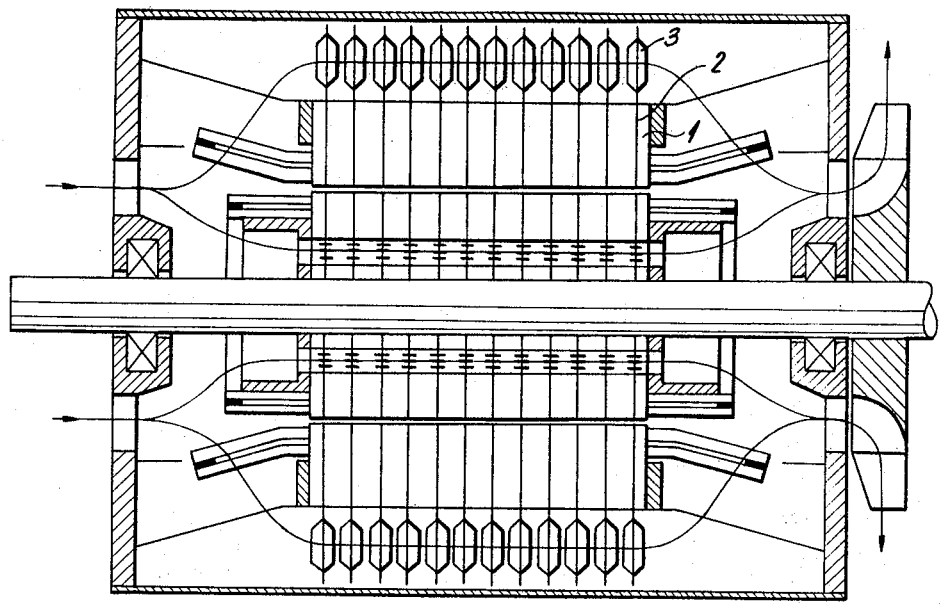
Figure 8:
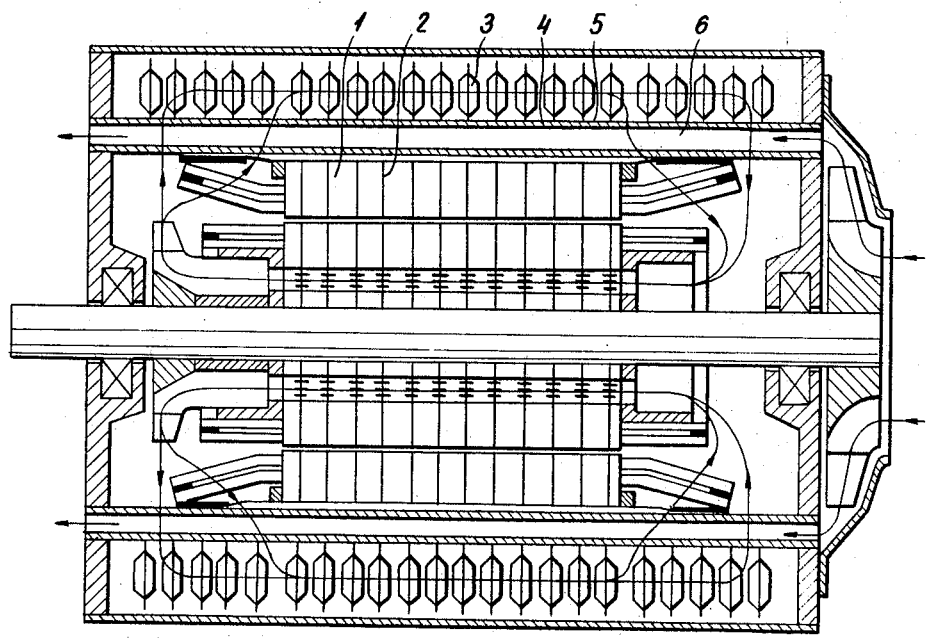

FIG. 1 is a longitudinal section through the cooling arrangement, fitted on the periphery of the laminated iron body of a rotating electric machine, FIG. 2 is a side elevation thereof, FIG. 3 illustrates the cooling arrangement provided within the ring of the laminated iron body, FIG. 4 is a side elevation thereof, FIG. 5 illustrates the arrangement on the periphery of the laminated iron body of a rotating electric machine with tube cooling, FIG. 6 is a side elevation of the arrangement according to FIG. 5, FIG. 7 is a longitudinal section through an open machine provided with the cooling arrangement according to the invention, and FIG. 8 is a longitudinal section through a closed machine provided with tube cooling and with the cooling arrangement according to the invention.

The cooling plate 2 projects into the laminated iron body 1. The fins 3 are formed on the cooling plates. The cooling plate is fitted on the axial cooling tube 4 by means of the flanged-out edge 5. The finned cooling insert 6 is fixedly fitted in the cooling tube.

With the use of the cooling arrangement according to the invention, the active dimensions of the electric machine and the length of the rotor block of the stator and rotor windings are reduced, whereby the copper losses and the excitation energy, as also the diameter of the machine, are reduced.

To sum up, therefore, the invention is an arrangement for cooling the laminated bodies of rotating electric machines with cooling plates consisting of a material of good thermal conductivity disposed between the laminations in any desired spaced relationship, the cooling plates of the stator projecting beyond the periphery of the laminated body of the latter, characterised by a combination of the following features:

(a) Fins 3 are stamped out of the plane of the cooling plates 2 outside and/or inside the laminated body 1 of the stator or inside the laminated body 1 of the rotor, and bent out around their central line, and they are disposed substantially perpendicularly to the plane of the cooling plates, the fins situated inside the laminated bodies 1 projecting into apertures stamped in the laminated bodies, (b) Cooling tubes 4 are disposed with their axes parallel in that portion of the cooling plates 2 which projects beyond the outer periphery of the laminated body 1 of the stator.

In addition, the invention relates to an arrangement in which cooling tubes disposed in one or more rows extend axially through holes stamped and flanged-out in the cooling plates, so as to be in metalic contact therewith, characterised in that, on the cooling plates projecting from the row of cooling tubes formed outside the ring of the laminated iron stator body, on the parts projecting beyond the tubes, or on the parts situated between the tubes, fins extending perpendicularly to the surfaces of the cooling plates are bent out, the said fins permitting the axial flow of the inner coolant, being twisted about their longitudinal axis and adjoining the cooling plates or adjoining one another in the direction of the said axis at both ends.

In addition, the invention concerns an arrangement in which a metallic pressing ring is provided on the flanged-out portion of the cooling plate.

The invention furthermore relates to an arrangement in which the cooling tubes are upset from the inside for a good thermally conducting connection between the cooling plates and the cooling tubes.

The invention also relates to an arrangement in which multibranch cooling inserts or metal inserts 6 are fitted into the cooling tubes for the purpose of increasing the heat dissipation.

The invention furthermore relates to an arrangement in which finned cooling plates are also provided on the parts of the cooling tubes over the overhangs.

The invention furthermore relates to an arrangement in which the axial cooling tubes are adjoined by connecting and distribution elements, as also tube fittings, which serve to supply into and to carry away from the cooling tubes the outer coolant, preferably a liquid.

I claim:

1. In a rotating electric machine having a stator and a rotor at least one of which is comprised of a plurality of laminae; the improvement comprising cooling plates disposed between the laminae, the laminae having holes extending axially therethrough with the holes in adjacent laminae in axial alignment with each other to form a passageway confined on all lateral sides by the laminae, the cooling plates having integral fins thereon disposed in said passageway, said fins being formed from the material of the plates and bent substantially perpendicular to the plane of the plates.

2. In a rotating electric machine having a stator and a rotor in which at least the stator is comprised of a plurality of laminae; the improvement comprising cooling plates disposed between the laminae of the stator, the cooling plates extending radially outwardly beyond the stator and having integral fins formed from the material of the plates and bent transverse to the plane of the plates with the fins located radially outwardly beyond the contours of the laminae of the stator, and cooling tubes extending perpendicularly through and in heat exchange contact with said plates radially outwardly beyond the contours of the stator.

3. Structure as claimed in claim 2, said cooling plates having integral annular flanges thereon that surround and are in contact with said cooling tubes.

4. Structure as claimed in claim 3, the flange on one cooling plate contacting the next adjacent cooling plate.

5. Structure as claimed in claim 2, some of said fins being disposed between said cooling tubes.

6. Structure as claimed in claim 2, and finned cooling inserts in the cooling tubes.

References Cited

UNITED STATES PATENTS

| | | | |
|---|---|---|---|
| 996,927 | 7/1911 | Ihlder | 310—65 |
| 1,080,611 | 12/1913 | Wait | 310—64 |
| 3,414,749 | 12/1968 | Abegg | 310—217 X |

DONOVAN F. DUGGAN, Primary Examiner